(12) United States Patent
Li et al.

(10) Patent No.: US 11,429,133 B2
(45) Date of Patent: Aug. 30, 2022

(54) MOBILE TERMINAL

(71) Applicant: HUAWEI TECHNOLOGIES CO., LTD., Guangdong (CN)

(72) Inventors: Tongjie Li, Shenzhen (CN); Junyong Zhang, Shenzhen (CN); Xiaosong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 16/496,804

(22) PCT Filed: Jun. 26, 2017

(86) PCT No.: PCT/CN2017/089948
§ 371 (c)(1),
(2) Date: Sep. 23, 2019

(87) PCT Pub. No.: WO2018/171063
PCT Pub. Date: Sep. 27, 2018

(65) Prior Publication Data
US 2021/0103310 A1 Apr. 8, 2021

(30) Foreign Application Priority Data

Mar. 24, 2017 (CN) .......................... 201710182423.3

(51) Int. Cl.
G06F 1/08 (2006.01)
G06F 1/06 (2006.01)
H04M 1/02 (2006.01)

(52) U.S. Cl.
CPC .................. *G06F 1/08* (2013.01); *G06F 1/06* (2013.01); *H04M 1/0264* (2013.01); *H04M 1/0266* (2013.01)

(58) Field of Classification Search
CPC ...................................... G06F 1/08; G06F 1/06
See application file for complete search history.

(56) References Cited

U.S. PATENT DOCUMENTS 5,909,144 A 6/1999 Puckette et al.
6,211,715 B1 * 4/2001 Terauchi .................. G06F 1/06
327/295
(Continued)

FOREIGN PATENT DOCUMENTS

CN 101093403 A 12/2007
CN 102801174 A 11/2012
(Continued)

OTHER PUBLICATIONS

Partial Supplementary European Search Report dated Feb. 24, 2020, issued in EP Application No. 17901891.6. (20 pages).
Office Action dated Apr. 27, 2021, issued in counterpart KR Application No. 10-2019-7030455, with English Translation. (12 pages).
National Instruments,"Synchronization Basics",dated May 9, 2012, total 5 pages.

(Continued)

*Primary Examiner* — Phil K Nguyen
(74) *Attorney, Agent, or Firm* — WHDA, LLP

(57) ABSTRACT

A mobile terminal, including a clock generator, a first frequency conversion circuit, a first module, a second frequency conversion circuit, and a second module. The first frequency conversion circuit performs frequency conversion on a clock signal generated by the clock generator, to obtain a first clock signal, and outputs the first clock signal to the first module. The second frequency conversion circuit performs frequency conversion on the clock signal generated by the clock generator, to obtain a second clock signal, and outputs the second clock signal to the second module. The mobile terminal has an improved anti-electromagnetic interference capability.

10 Claims, 12 Drawing Sheets

(56) References Cited

U.S. PATENT DOCUMENTS

| | | | | |
|---|---|---|---|---|
| 7,242,223 | B1* | 7/2007 | Alon | G04D 7/1207 |
| | | | | 327/39 |
| 8,629,703 | B2* | 1/2014 | Shibayama | G06F 1/04 |
| | | | | 327/295 |
| 8,706,073 | B2 | 4/2014 | Borsella et al. | |
| 8,799,700 | B2 | 8/2014 | Arumugham et al. | |
| 10,992,301 | B1* | 4/2021 | Mitric | H03L 7/0994 |
| 2003/0002606 | A1* | 1/2003 | Chen | H04L 7/0045 |
| | | | | 375/354 |
| 2004/0064748 | A1 | 4/2004 | Syed | |
| 2004/0100310 | A1* | 5/2004 | Kurakane | G06F 1/3203 |
| | | | | 327/114 |
| 2004/0225977 | A1* | 11/2004 | Akkerman | G06F 30/33 |
| | | | | 716/108 |
| 2007/0071003 | A1* | 3/2007 | Landolt | H04L 25/4908 |
| | | | | 370/389 |
| 2007/0297550 | A1 | 12/2007 | Gilliland | |
| 2012/0072631 | A1 | 3/2012 | Chirca et al. | |
| 2015/0016476 | A1* | 1/2015 | Herzog | H04J 3/0635 |
| | | | | 370/503 |
| 2016/0239649 | A1* | 8/2016 | Zhao | H04W 12/06 |
| 2016/0357889 | A1 | 12/2016 | Garg et al. | |
| 2017/0083126 | A1* | 3/2017 | Lim | G06F 3/0416 |
| 2017/0214405 | A1* | 7/2017 | Yang | G06F 1/06 |
| 2019/0294202 | A1* | 9/2019 | Hanai | H02M 1/00 |

FOREIGN PATENT DOCUMENTS

| | | |
|---|---|---|
| CN | 106341219 A | 1/2017 |
| EP | 0834791 A2 | 4/1998 |
| EP | 1736851 A2 | 12/2006 |
| JP | 1-228006 A | 9/1989 |
| JP | 2-227698 A | 9/1990 |
| JP | 8-249836 A | 9/1996 |
| JP | 10-275024 A | 10/1998 |
| JP | 2004-110718 A | 4/2004 |
| JP | 2007-193658 A | 8/2007 |
| JP | 2008-17322 A | 1/2008 |
| JP | 2010-34662 | 2/2010 |
| JP | 2010206373 A | 9/2010 |
| JP | 2016136731 A | 7/2016 |
| KR | 19980080707 A | 11/1998 |
| KR | 20140113443 A | 9/2014 |

OTHER PUBLICATIONS

International Search Report dated Dec. 29, 2017, issued in counterpart application No. PCT/CN2017/089948, with English translation.

Office Action dated Nov. 30, 2020, issued in counterpart JP Application No. 2019-552191, with English translation (11 pages).

* cited by examiner

MOBILE TERMINAL

CROSS-REFERENCE TO RELATED APPLICATIONS

This application is a National Stage of International Application No. PCT/CN2017/089948, filed on Jun. 26, 2017, which claims priority to Chinese Patent Application No. 201710182423.3, filed on Mar. 24, 2017. Both of the aforementioned applications are hereby incorporated by reference in their entireties.

TECHNICAL FIELD

The embodiments of the present invention relate to the field of electronic technologies, and in particular, to a mobile terminal.

BACKGROUND

A clock source is a module that generates a clock pulse signal, and can provide a clock for running another module. With the miniaturization of electronic device, the distance between modules is smaller. When clock frequencies of modules are the same or basically the same, adjacent electromagnetic interference causes the modules to run abnormally, for example, a fingerprint unlock speed is excessively slow, there is stalling during shooting and photographing, there is key linkage during dialing, and there is a broken line when a line is drawn on a touch panel.

To cancel inter-module electromagnetic interference, a frequency-domain management method is used in the prior art, to configure different crystal oscillators for modules, so that the crystal oscillators generate clocks having different frequencies. In this way, clock frequencies of the modules are different, and electromagnetic interference can be reduced.

However, due to the impact of an ambient temperature, clock frequencies generated by different types of crystal oscillators deviate at different amplitudes. In this way, clock frequencies or high-order harmonic frequencies of two modules overlap at a particular frequency, and inter-module electromagnetic interference causes dysfunctions of the two modules.

Embodiments of the present invention provide a mobile terminal, having a better anti-electromagnetic interference capability.

According to a first aspect of the embodiments of the present invention, a mobile terminal is provided, and includes: a clock generator, a first frequency conversion circuit, a first module, a second frequency conversion circuit, and a second module. The first frequency conversion circuit performs frequency conversion on a clock signal generated by the clock generator, to obtain a first clock signal, and outputs the first clock signal to the first module. The second frequency conversion circuit performs frequency conversion on the clock signal generated by the clock generator, to obtain a second clock signal, and outputs the second clock signal to the second module. The first frequency conversion circuit is connected to both the clock generator and the first module, the second frequency conversion circuit is connected to both the clock generator and the second module, and the first clock signal and the second clock signal are clock signals having different frequencies.

In the mobile terminal, both the first clock signal and the second clock signal are obtained by performing frequency conversion on the clock signal generated by the clock generator, that is, the first clock signal and the second clock signal are generated by the same clock source. When temperature drift occurs in the clock signal generated by the clock generator, a temperature drift percentage of the first clock signal is the same as a temperature drift percentage of the second clock signal, where the temperature drift percentage is a clock frequency deviation percentage under an action of a temperature. In this way, clock frequencies of different modules hardly overlap, so that electromagnetic interference is reduced.

SUMMARY

In a possible implementation, a ratio of a clock frequency of the first clock signal to a clock frequency of the second clock signal is M/N, where M is a positive odd number, N is 2 raised to the power of n, and n is a positive integer. Because a product of M and an odd number cannot be equal to N, an odd harmonic frequency of the first clock signal and a harmonic frequency of the second clock signal hardly overlap. Compared with the prior art, electromagnetic interference between the first module and the second module can be effectively reduced by using the foregoing parameter configuration.

In another possible implementation, the first module includes a third frequency conversion circuit and a first function unit, and the second module includes a fourth frequency conversion circuit and a second function unit. The third frequency conversion circuit performs frequency conversion on the first clock signal, to obtain a third clock signal, and outputs the third clock signal to the first function unit. The fourth frequency conversion circuit performs frequency conversion on the second clock signal, to obtain a fourth clock signal, and outputs the fourth clock signal to the second function unit. The third frequency conversion circuit is connected to both the first frequency conversion circuit and the first function unit, the fourth frequency conversion circuit is connected to both the second frequency conversion circuit and the second function unit, and a ratio of a clock frequency of the third clock signal to a clock frequency of the fourth clock signal is M/N, where M is a positive odd number, N is 2 raised to the power of n, and n is a positive integer. In this way, because a product of M and an odd number cannot be equal to N, an odd harmonic frequency of the third clock signal and a harmonic frequency of the fourth clock signal hardly overlap. Compared with the prior art, electromagnetic interference between the first function unit and the second function unit can be effectively reduced by using the foregoing parameter configuration.

In another possible implementation, the first module is a touch panel module, a display module, a fingerprint recognition module, or a camera module, the second module is a touch panel module, a display module, a fingerprint recognition module, or a camera module, and the first module and the second module are modules of different types.

In another possible implementation, the clock generator is a crystal oscillator, a semiconductor oscillator, or a ceramic oscillator.

In another possible implementation, the mobile terminal further includes a power adapter. A ratio of the clock frequency of the first clock signal to the fundamental frequency of the power adapter is M/N, or a ratio of the clock frequency of the second clock signal to the fundamental frequency of the power adapter is M/N, where M is a positive odd number, N is 2 raised to the power of n, and n is a positive integer.

In another possible implementation, the mobile terminal further includes an audio processing module and a video processing module, and a ratio of the fundamental frequency of the audio processing module to the fundamental frequency of the video processing module is M/N, where M is a positive odd number, N is 2 raised to the power of n, and n is a positive integer.

In another possible implementation, the mobile terminal further includes a third module and a fourth module, the third module includes a fifth frequency conversion circuit and a third function unit, and the fourth module includes a sixth frequency conversion circuit and a fourth function unit. The fifth frequency conversion circuit performs frequency conversion on the clock signal generated by the clock generator, to obtain a fifth clock signal, and outputs the fifth clock signal to the third function unit. The sixth frequency conversion circuit performs frequency conversion on the clock signal generated by the clock generator, to obtain a sixth clock signal, and outputs the sixth clock signal to the fourth function unit. The fifth frequency conversion circuit is connected to both the clock generator and the third function unit, the sixth frequency conversion circuit is connected to both the clock generator and the fourth function unit, and the fifth clock signal and the sixth clock signal are clock signals having different frequencies. In the mobile terminal, both the fifth clock signal and the sixth clock signal are obtained by performing frequency conversion on the clock signal generated by the clock generator. When temperature drift occurs in the clock signal generated by the clock generator, a temperature drift percentage of the fifth clock signal is the same as a temperature drift percentage of the sixth clock signal. In this way, a clock frequency of the third function unit and a clock frequency of the fourth function unit hardly overlap, so that electromagnetic interference is reduced.

In another possible implementation, a ratio of a clock frequency of the fifth clock signal to a clock frequency of the sixth clock signal is M/N, where M is a positive odd number, N is 2 raised to the power of n, and n is a positive integer.

According to a second aspect of the embodiments of the present invention, a mobile terminal is provided. The mobile terminal includes a first module and a second module. The first module includes a first clock generator, the second module includes a second clock generator, and a temperature drift trend of a clock frequency of the first clock generator is consistent with a temperature drift trend of a clock frequency of the second clock generator. In this way, because temperature drift trends of clock frequencies of different modules are consistent, and the clock frequencies of the different modules are different, the clock frequencies of the different modules hardly overlap. Compared with the prior art, electromagnetic interference between the first module and the second module can be effectively reduced.

In a possible implementation, a ratio of the clock frequency generated by the first clock generator to the clock frequency generated by the second clock generator is M/N, where M is a positive odd number, N is 2 raised to the power of n, and n is a positive integer. Because a product of M and an odd number cannot be equal to N, an odd harmonic frequency of a first clock signal and a harmonic frequency of a second clock signal hardly overlap. Compared with the prior art, electromagnetic interference between the first module and the second module can be effectively reduced by using the foregoing parameter configuration.

In another possible implementation, the first module is a touch panel module, a display module, a fingerprint recognition module, or a camera module, the second module is a touch panel module, a display module, a fingerprint recognition module, or a camera module, and the first module and the second module are modules of different types.

In another possible implementation, both the temperature drift trend of the clock frequency of the first clock generator and the temperature drift trend of the clock frequency of the second clock generator are monotonically decreasing; or both the temperature drift trend of the clock frequency of the first clock generator and the temperature drift trend of the clock frequency of the second clock generator are monotonically decreasing; or curves of both the temperature drift trend of the clock frequency of the first clock generator and the temperature drift trend of the clock frequency of the second clock generator are parabolas. In this way, when two modules use the foregoing temperature drift trends of the clock frequencies, electromagnetic interference can be effectively reduced.

In another possible implementation, both the first clock generator and the second clock generator are crystal oscillators.

In another possible implementation, both the first clock generator and the second clock generator are semiconductor oscillators.

In another possible implementation, both the first clock generator and the second clock generator are ceramic oscillators.

In the embodiments of the present invention, the mobile terminal includes the clock generator, the first frequency conversion circuit, the first module, the second frequency conversion circuit, and the second module. The first frequency conversion circuit performs frequency conversion on the clock signal generated by the clock generator, to obtain the first clock signal, and outputs the first clock signal to the first module. The second frequency conversion circuit performs frequency conversion on the clock signal generated by the clock generator, to obtain the second clock signal, and outputs the second clock signal to the second module. It can be learned that clocks of the foregoing modules are the same clock source. When an ambient temperature affects a clock frequency, temperature drift percentages of the clock frequencies of the modules are the same as a temperature drift percentage of the clock frequency of the clock generator. In this way, clock frequencies of different modules hardly overlap, so that electromagnetic interference can be reduced as much as possible.

DESCRIPTION OF EMBODIMENTS

Figure 1:
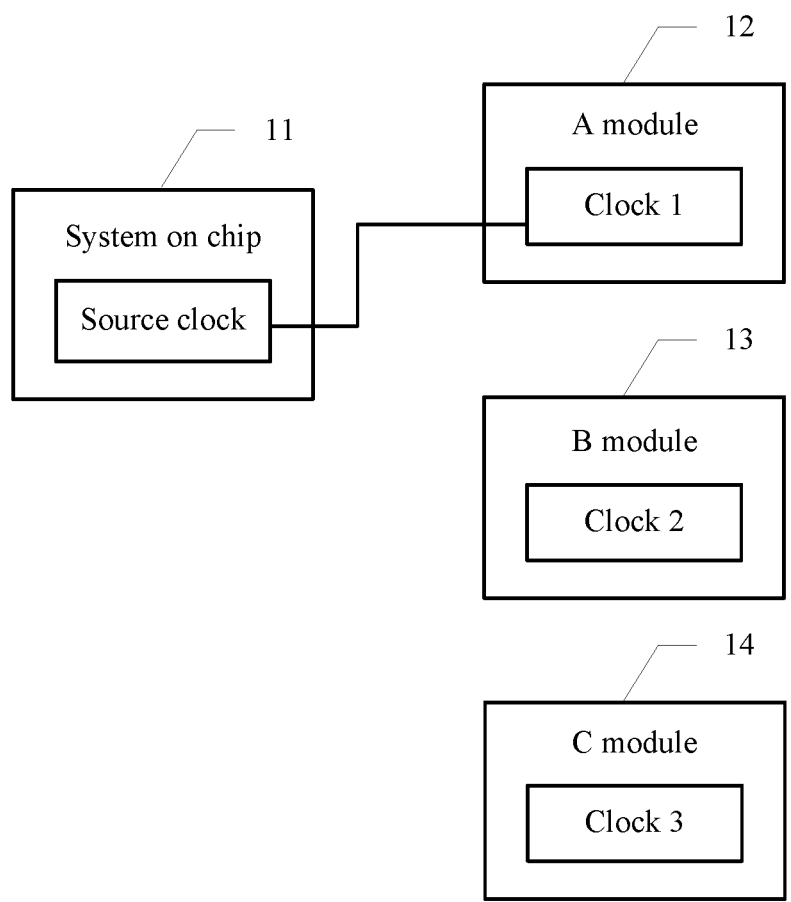
FIG. 1 is a schematic diagram of configured clocks of an existing mobile terminal.

A mobile terminal is a computer device that can be moved during use, for example, a mobile phone, a tablet computer, an in-vehicle computer, a wearable electronic device, or a mobile point of sales terminal (point of sales terminal, POS). A system on chip (System on Chip, SOC), also referred to as an SoC, is disposed in the mobile terminal. FIG. 1 is a schematic diagram of clock configuration of modules inside an existing terminal. A module has an independent function in an electronic device. A crystal oscillator of an SOC 11 generates a source clock. The crystal oscillator is also referred to as a quartz crystal oscillator, briefly referred to as a crystal oscillator. Each module has a clock signal. A source clock is configured in the SOC 11, a clock 1 is configured for an A module 12, a clock 2 is configured for a B module 13, and a clock 3 is configured for a C module 14. The source clock may be output as a clock of another module, for example, the clock 1. Both the clock 2 and the clock 3 are independent clocks, which are separately generated by independent clock oscillators, and are unrelated to the source clock.

Figure 2:
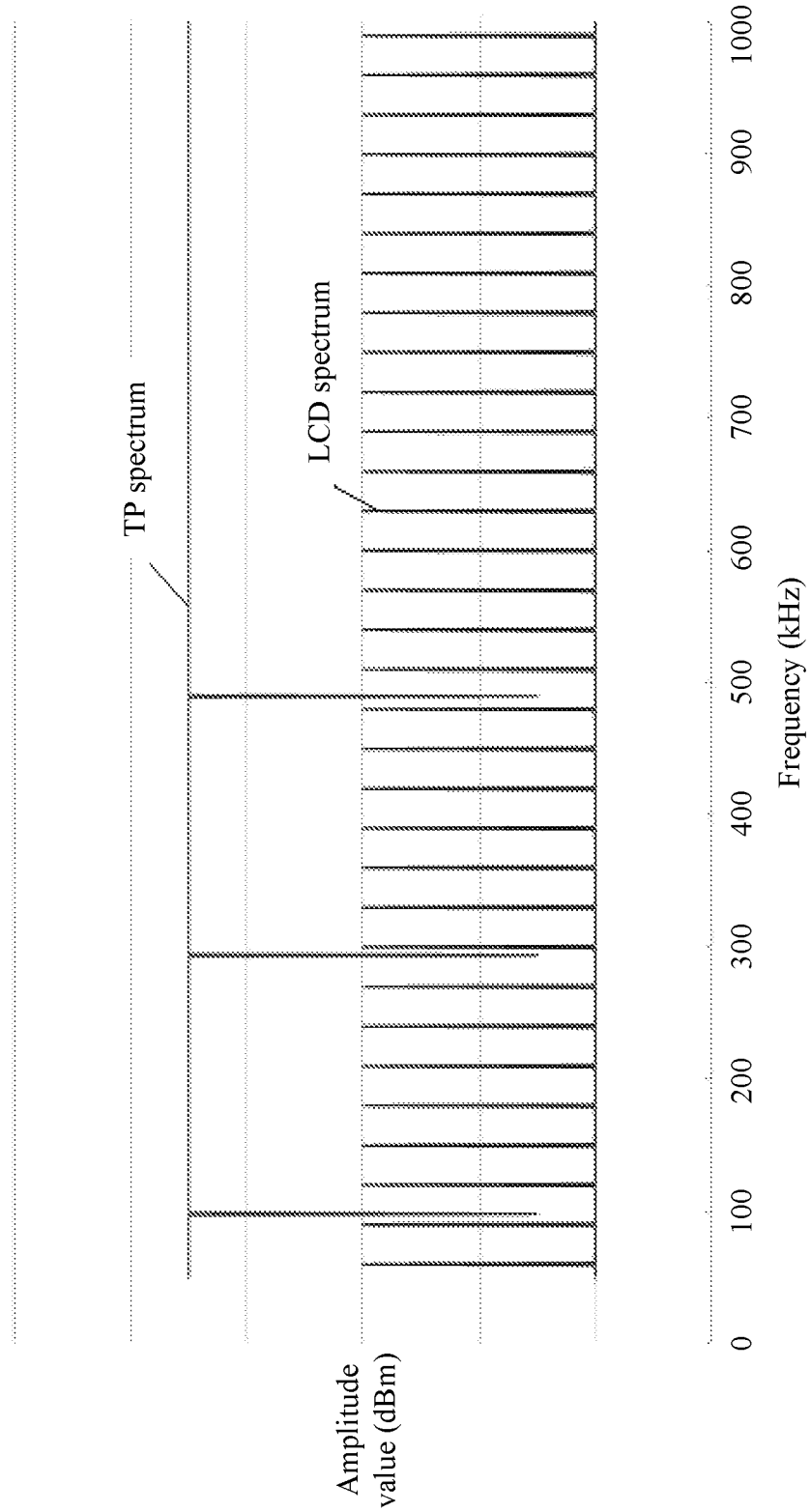
FIG. 2 is a schematic spectral distribution diagram of an existing TP module and LCD module in a normal state.

A touch panel (touch panel, TP) module is used as an example of a module 2, and a liquid crystal display (liquid crystal display, LCD) module is used as an example of a module 3. FIG. 2 is a schematic spectral distribution diagram of a TP module and an LCD module in a normal state. The unit of the horizontal axis is kilohertz (kHz), and the unit of the vertical axis is decibel-milliwatts (dBm). The fundamental frequency of the LCD module is 30 kHz, and a harmonic frequency is an integer multiple of 30 kHz. The fundamental frequency of the TP module is 98 kHz, and a harmonic frequency of the TP module is an odd multiple of 98 kHz, for example, 3, 5, 7, 9, or 11 times 98 kHz. In this way, there is a frequency separation between a harmonic frequency of the TP module and a harmonic frequency of the LCD module, and in this case, an inter-module harmonic interference degree is relatively low.

Figure 3:
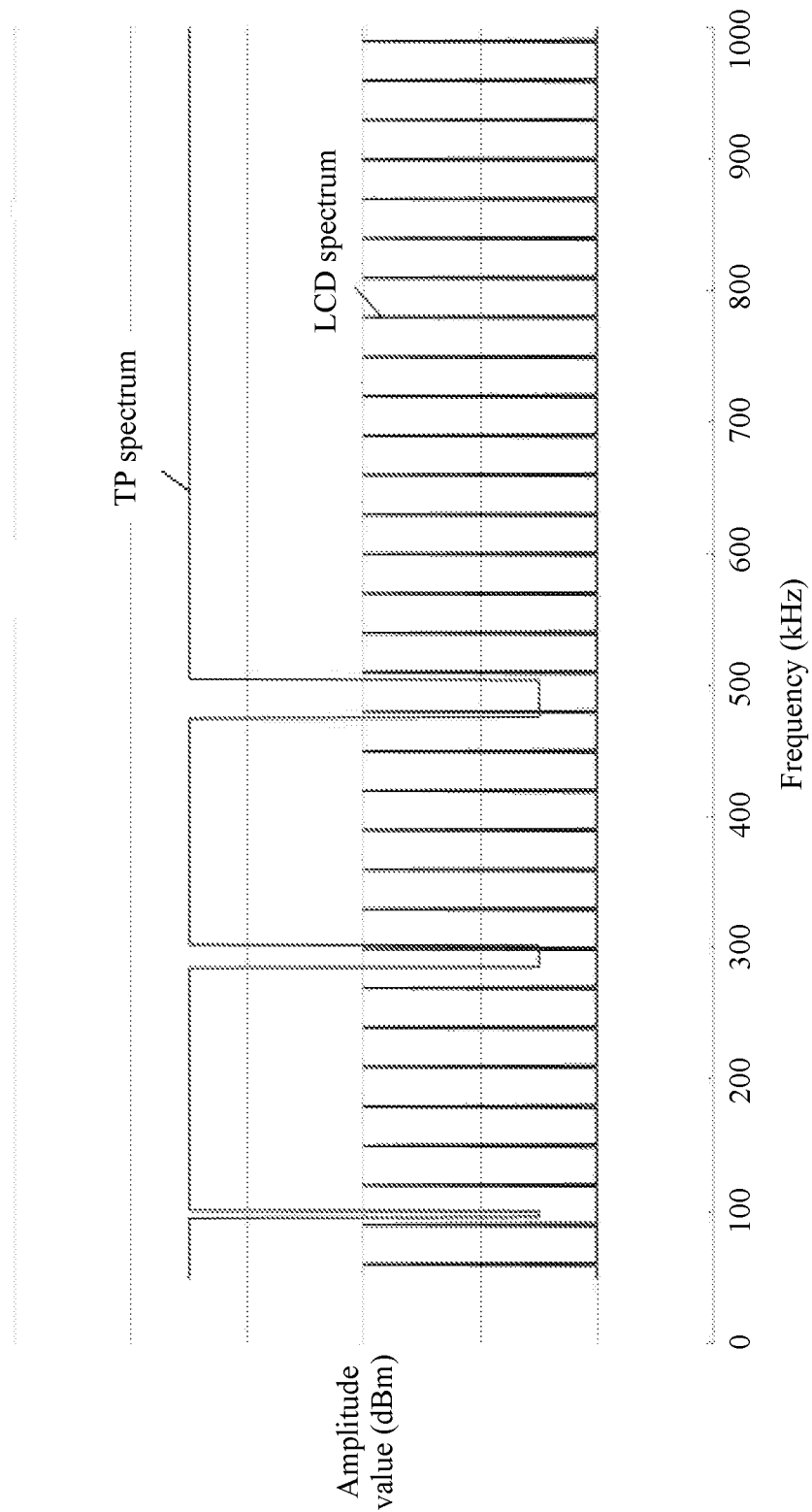
FIG. 3 is a schematic diagram of temperature drift of frequencies of an existing TP module and LCD module.

However, because geometric shapes or cutting manners of crystals in different crystal oscillators are different, temperature drift amplitudes of frequencies of the clock 2 and the clock 3 are different. Referring to FIG. 3, under impact of an ambient temperature, if a temperature drift percentage of the TP fundamental frequency is ±3%, the harmonic frequency of the TP module changes within a range of ±3%. In this way, a third-harmonic frequency of the TP module and a harmonic frequency of the LCD module overlap at 300 kHz, leading to harmonic interference. Similarly, a fifth-harmonic frequency of the TP module and a harmonic frequency of the LCD module overlap at 480 kHz, leading to harmonic interference. Harmonic interference easily causes a malfunction of a module, and a harmonic frequency is also referred to as noise.

Figure 4:
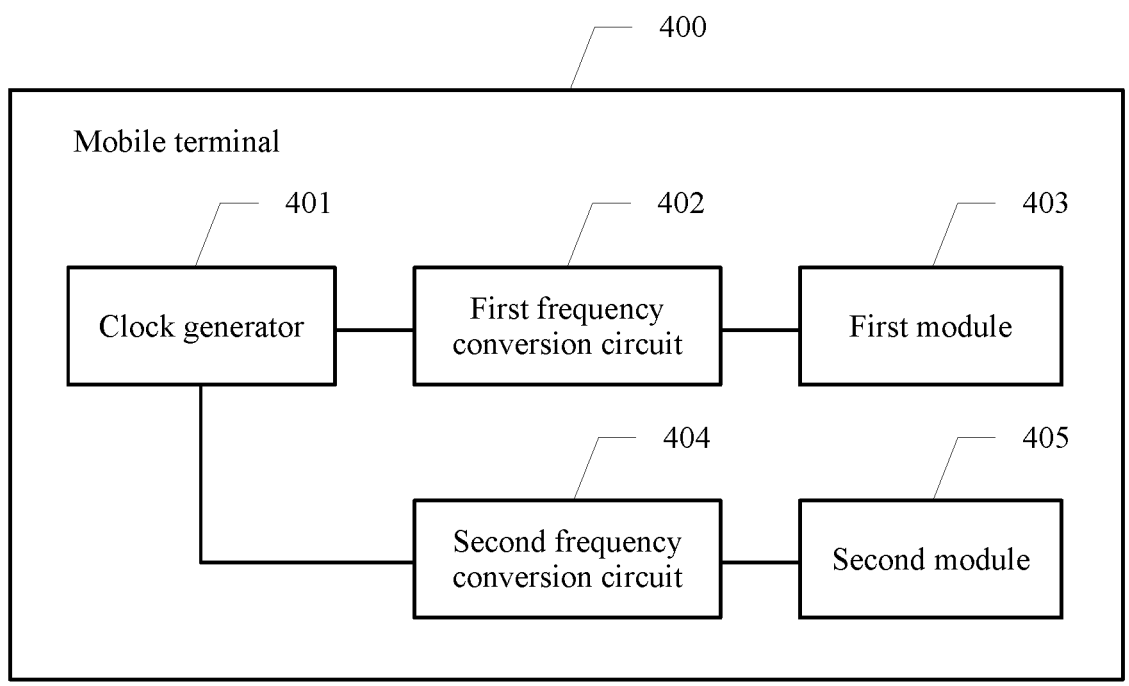
FIG. 4 is a schematic diagram of a mobile terminal according to an embodiment of the present invention.

To resolve frequency overlapping caused because clock frequencies of different crystal oscillators are affected by an environment, in a mobile terminal according to an embodiment of the present invention, one crystal oscillator provides clocks for a plurality of modules. Referring to FIG. 4, an embodiment of a mobile terminal 400 provided in the present invention includes:

a clock generator 401, a first frequency conversion circuit 402, a first module 403, a second frequency conversion circuit 404, and a second module 405.

The first frequency conversion circuit 402 is connected to both the clock generator 401 and the first module 403, and is configured to: perform frequency conversion on a clock signal generated by the clock generator 401, to obtain a first clock signal, and output the first clock signal to the first module 403.

The second frequency conversion circuit 404 is connected to both the clock generator 401 and the second module 405, and is configured to: perform frequency conversion on the clock signal generated by the clock generator 401, to obtain a second clock signal, and output the second clock signal to the second module 405, where the first clock signal and the second clock signal are clock signals having different frequencies.

The clock generator 401 may be a crystal oscillator, a semiconductor oscillator, or a ceramic oscillator, and the semiconductor oscillator is also referred to as a silicon oscillator.

A frequency conversion circuit may be a frequency dividing circuit, a frequency multiplying circuit, or a combined circuit including a frequency dividing circuit and a frequency multiplying circuit. For example, the first frequency conversion circuit 402 is a frequency dividing circuit, a ratio of an input frequency to an output frequency of the first frequency conversion circuit 402 is n1, the second frequency conversion circuit 404 is a frequency multiplying circuit, and a ratio of an input frequency to an output frequency of the second frequency conversion circuit 404 is n2. When a frequency of the clock signal generated by the clock generator 401 is 26 MHz, a frequency of a clock signal output from the frequency dividing circuit is 26 MHz/n1, and a frequency of a clock signal output from the frequency multiplying circuit is n2×26 MHz.

In some optional embodiments, the first module 403 is a touch panel module, a display module, a fingerprint recognition module, or a camera module, the second module 405 is a touch panel module, a display module, a fingerprint recognition module, or a camera module, and the first module 403 and the second module 405 are modules of different types. A display of the display module may be an LCD, a light emitting diode (Light Emitting Diode, LED), an organic light emitting diode (Organic Light Emitting Diode, OLED), or the like.

It may be understood that the mobile terminal 400 may further include another frequency conversion circuit and another module. Each frequency conversion circuit can convert a frequency of the clock signal generated by the clock generator into a clock frequency of a corresponding module.

In this embodiment, the clock of the first module 403 and the clock of the second module 405 are the same clock source. When an ambient temperature affects a clock frequency, it is assumed that a temperature drift percentage of f0 is a %, that is, (1±a %)×f0. Clock frequencies output by the frequency conversion circuits also change at a same amplitude, that is, f1=(1±a %)×f0/n1, and f2=(1±a %)×f0×n2. A temperature drift percentage of a harmonic frequency of each module is the same as the temperature drift percentage of f0. In this way, clock frequencies of different modules hardly overlap, so that an electromagnetic interference degree is very low. A temperature drift percentage is a percentage of a frequency deviation amplitude caused by a temperature to a normal frequency.

Figure 5:
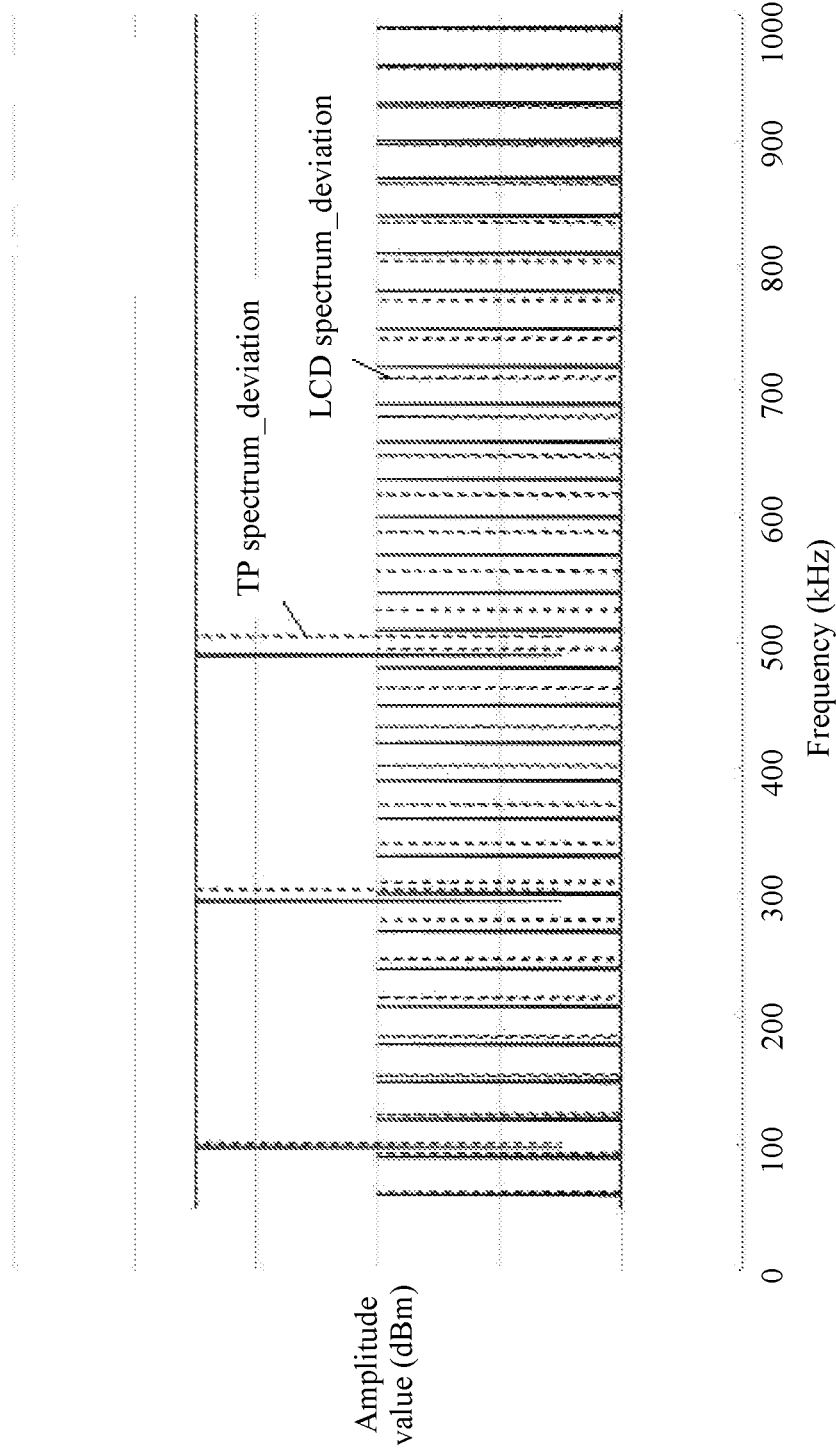
FIG. 5 is a schematic diagram of spectral deviations of a TP module and an LCD module according to an embodiment of the present invention.

For example, FIG. 5 is a schematic diagram of spectral deviations of two modules. The first module 403 is a TP module, the second module 405 is an LCD module, dotted lines in an upper part of FIG. 5 is a TP spectrum after deviation, and dotted lines in a lower part of FIG. 5 is an LCD spectrum after deviation. It can be seen from FIG. 5 that a spectral deviation amplitude of the first module 403 is the same as a spectral deviation amplitude of the second module 405, and clock frequencies of the two modules hardly overlap, so that an electromagnetic interference degree is very low.

In an optional embodiment, a ratio of a clock frequency of the first clock signal to a clock frequency of the second clock signal is M/N, where M is a positive odd number, N is 2 raised to the power of n, and n is a positive integer.

In this embodiment, because M is a positive odd number, and N is 2 raised to the power of a positive integer, M/N cannot be an integer, and the clock frequency of the first clock signal cannot be equal to the clock frequency of the second clock signal, and cannot be equal to a positive integer multiple of the clock frequency of the second clock signal. In addition, an odd harmonic wave of the first clock signal may be a first-harmonic wave, a third-harmonic wave, a fifth-harmonic wave, or the like, and a product of an odd number and M/N cannot be an integer. Therefore, an odd harmonic frequency of the first clock signal cannot be equal to an integer multiple of a harmonic frequency of the second clock signal. In this way, it can be ensured that in a normal mode, fundamental frequencies or harmonic frequencies of the first module and the second module do not overlap.

Specifically, it is assumed that a fundamental frequency of the first clock signal is $F_1(1)$, the odd harmonic frequency of the first clock signal is $F_1(n3)=F_1(1)\times n3$, and n3 is an odd variable. It is assumed that a fundamental frequency of the second clock signal is $F_2(1)$, the harmonic frequency of the second clock signal is $F_2(n4)=F_2(1)\times n4$, and n4 is an even variable.

It can be learned from $F_1(1)/F_2(1)=M/N$ that $F_1(1)=F_2(1)\times M/N$.

A frequency spacing $\Delta f$ between harmonic frequencies of the foregoing two clock signals is:

$$\Delta f=|F_1(n3)-F_2(n4)|=|n3\times(M\times F_2(1))/N)-(n4\times F_2(1))|=|(n3\times M-n4\times N)\times F_2(1)/N|.$$

For example, the fundamental frequency of the first clock signal is 90 kHz, the fundamental frequency of the second clock signal is 40 kHz, and M/N=9/4. In this case, odd harmonic frequencies of 90 kHz are respectively 90 kHz, 270 kHz, 450 kHz, and the like, and harmonic frequencies of 40 kHz are respectively 40 kHz, 80 kHz, 120 kHz, 160 kHz, 200 kHz, 240 kHz, 280 kHz, and the like. It can be learned from the foregoing that a minimum frequency difference between the two clock signals is |90−80| or |280−270|, that is, 10 kHz.

Figure 8:
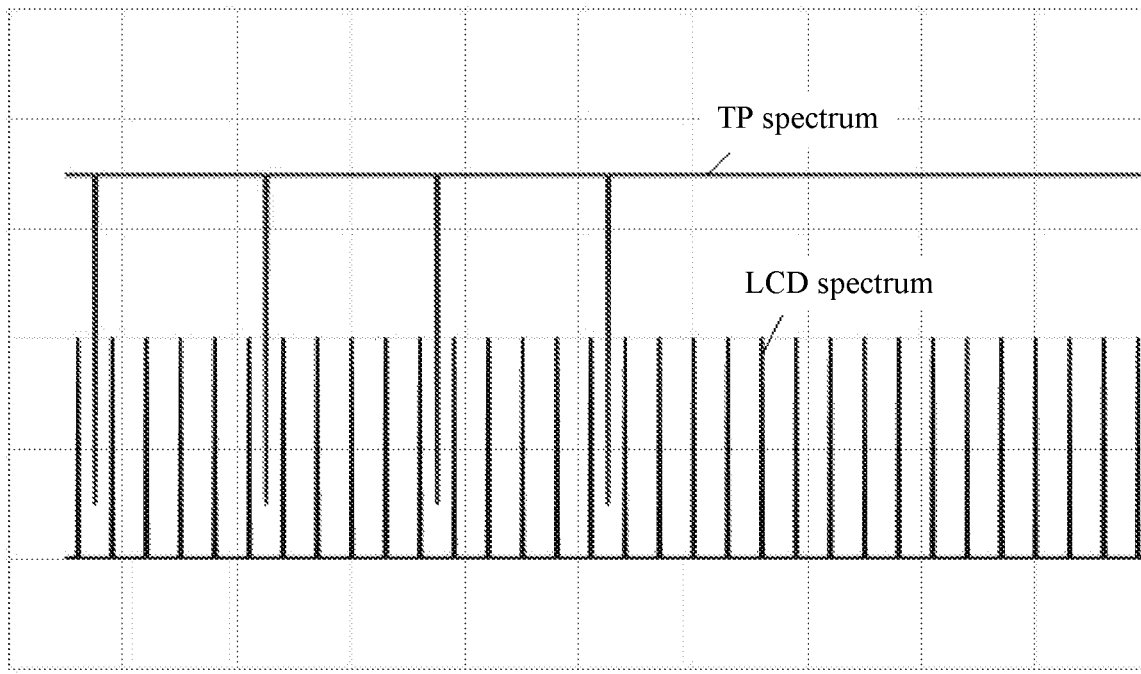
FIG. 8 is another schematic spectral distribution diagram of a TP module and an LCD module in a normal state.

It should be noted that a spacing between the clock frequencies of the two clock signals is always greater than or equal to $F_2(1)/N$, where $F_2(1)$ is the fundamental frequency of the second module. When the temperature drift percentage is less than $F_2(1)/N$, the two clock frequencies do not overlap. In this way, harmonic interference caused by temperature drift can be effectively reduced, as shown in FIG. 8. Alternatively, when a deviation amplitude of a clock frequency is less than $F_2(1)/N$ due to a common difference, the foregoing two clock frequencies do not overlap. In this way, electromagnetic interference caused by the common difference can be effectively reduced.

Figure 6:
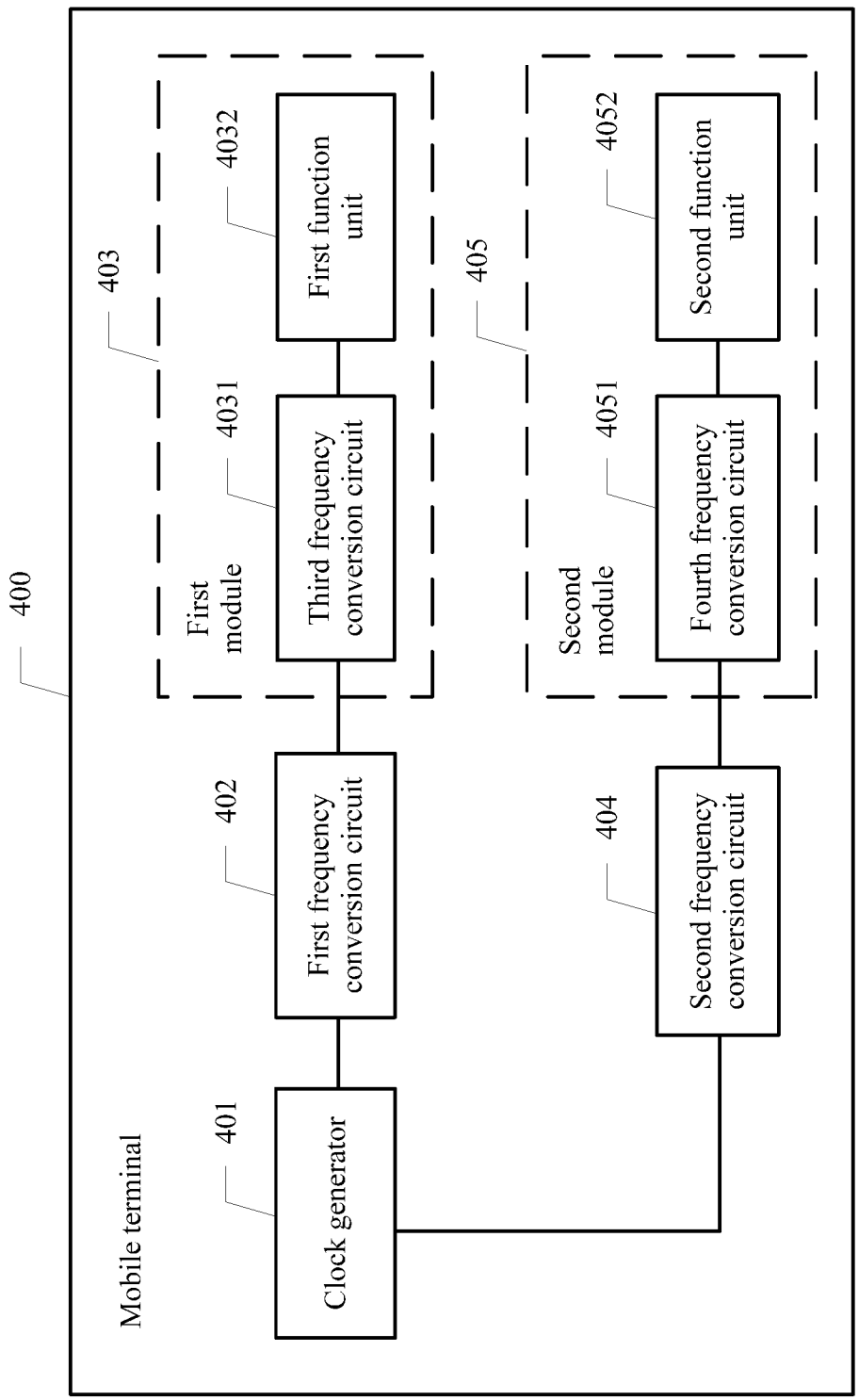
FIG. 6 is another schematic diagram of a mobile terminal according to an embodiment of the present invention.

Referring to FIG. 6, in another optional embodiment, the first module 403 includes a third frequency conversion circuit 4031 and a first function unit 4032, and the second module 405 includes a fourth frequency conversion circuit 4051 and a second function unit 4052. The third frequency conversion circuit 4031 is connected to both the first frequency conversion circuit 402 and the first function unit 4032, and is configured to: perform frequency conversion on the first clock signal, to obtain a third clock signal, and output the third clock signal to the first function unit 4032. The fourth frequency conversion circuit 4051 is connected to both the second frequency conversion circuit 404 and the second function unit 4052, and is configured to: perform frequency conversion on the second clock signal, to obtain a fourth clock signal, and output the fourth clock signal to the second function unit 4052. A ratio of a clock frequency of the third clock signal to a clock frequency of the fourth clock signal is M/N, where M is a positive odd number, N is 2 raised to the power of n, and n is a positive integer.

In this embodiment, because M is a positive odd number, and N is 2 raised to the power of a positive integer, M/N cannot be an integer, and the clock frequency of the third clock signal cannot be equal to the clock frequency of the fourth clock signal, and cannot be equal to an integer multiple of the clock frequency of the fourth clock signal. An odd harmonic wave of the third clock signal may be a first-harmonic wave, a third-harmonic wave, a fifth-harmonic wave, or the like, a product of an odd number and M/N cannot be an integer, and an odd harmonic frequency of the third clock signal cannot be equal to an integer multiple of a harmonic frequency of the fourth clock signal. In this way, it can be ensured that in a normal mode, fundamental frequencies or harmonic frequencies of the first function unit and the second function unit do not overlap.

It may be understood that when the first module is a touch panel module, the first function unit may be a touch panel circuit. When the second module is a liquid crystal display module, the second function unit may be a drive circuit of a liquid crystal display. The first module may further include another function unit connected to the first frequency conversion circuit, and the second module may further include another function unit connected to the second frequency conversion circuit.

In another optional embodiment, the mobile terminal includes a third module and a fourth module, the third module includes a fifth frequency conversion circuit and a third function unit, and the fourth module includes a sixth frequency conversion circuit and a fourth function unit. The fifth frequency conversion circuit is connected to both the clock generator 401 and the third function unit, and is configured to: perform frequency conversion on the first clock signal, to obtain a fifth clock signal, and output the fifth clock signal to the third function unit. The sixth frequency conversion circuit is connected to both the clock generator 401 and the fourth function unit, and is configured to: perform frequency conversion on the clock signal generated by the clock generator 401, to obtain a sixth clock signal, and output the sixth clock signal to the fourth function unit. A ratio of a clock frequency of the fifth clock signal to a clock frequency of the sixth clock signal is M/N, where M is a positive odd number, N is 2 raised to the power of n, and n is a positive integer.

In this embodiment, the fundamental frequency of the third module is the same as the fundamental frequency of the fourth module, and a clock frequency ratio of the foregoing two function units (that is, the third function unit and the fourth function unit) is M/N. Because M is a positive odd number, and N is 2 raised to the power of a positive integer, M/N cannot be an integer, and the clock frequency of the fifth clock signal cannot be equal to the clock frequency of the sixth clock signal, and cannot be equal to an integer multiple of the clock frequency of the sixth clock signal. In addition, an odd harmonic wave of the fifth clock signal may be a first-harmonic wave, a third-harmonic wave, a fifth-harmonic wave, or the like, a product of an odd number and M/N cannot be an integer, and an odd harmonic frequency of the fifth clock signal cannot be equal to an integer multiple of a harmonic frequency of the sixth clock signal. In this way, it can be ensured that in a normal mode, fundamental frequencies or harmonic frequencies of the third function unit and the fourth function unit do not overlap.

In some embodiments, an SOC of the mobile terminal may be connected to a power adapter. In the mobile terminal, a ratio of a clock frequency of a TP circuit to a clock frequency of the power adapter is M/N. Alternatively, a ratio of a clock frequency of a fingerprint recognition circuit to a clock frequency of the power adapter is M/N. Values of M and N are shown in the foregoing embodiment.

For ease of understanding, the following describes, in detail by using a specific application scenario, the mobile terminal provided in an embodiment of the present invention.

Figure 7:
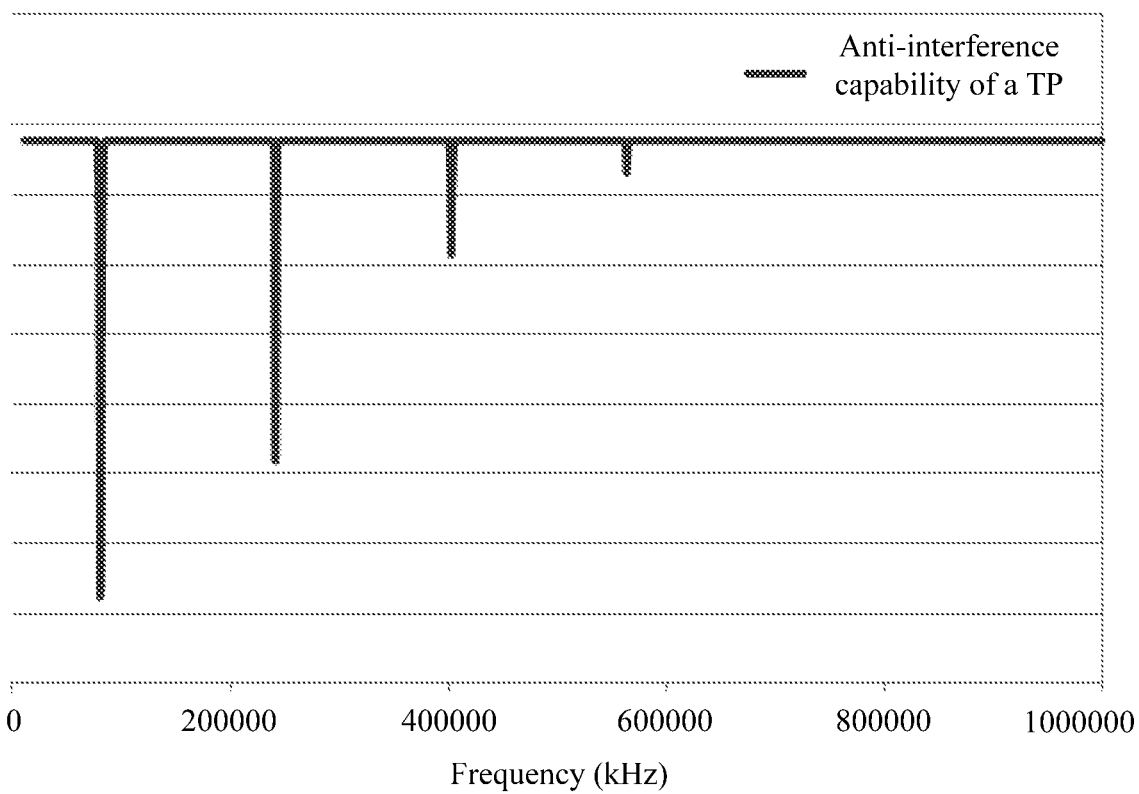
FIG. 7 is a schematic diagram of an anti-interference capability of a TP module according to an embodiment of the present invention.

For example, the mobile terminal is a mobile phone. The mobile phone includes a TP module and an LCD module. The fundamental frequency $F_1$ (1) of the TP module is 80 kHz, and the fundamental frequency $F_2$ (1) of the LCD module is 22.86 kHz. FIG. 7 is a schematic anti-interference diagram of the TP module. The TP module has a poor anti-interference capability at frequencies 80 kHz, 240 kHz, 400 kHz, and 560 kHz. In other words, odd harmonic waves such as a first-harmonic wave, a third-harmonic wave, a fifth-harmonic wave, and a seventh-harmonic wave of the fundamental frequency of 80 kHz are easily interfered with, and in this case, TP module detection easily malfunctions.

When the TP module and the LCD module work normally, because $F_1$ (1)/$F_2$ (1)=M/N=7/2, an odd harmonic frequency of the TP module and a harmonic frequency of the LCD module do not overlap, as shown in FIG. 8. In this case, a spacing between frequencies at which the two modules generate harmonic waves is $\Delta f = F_2$ (1)/2=11.43 kHz.

Figure 9:
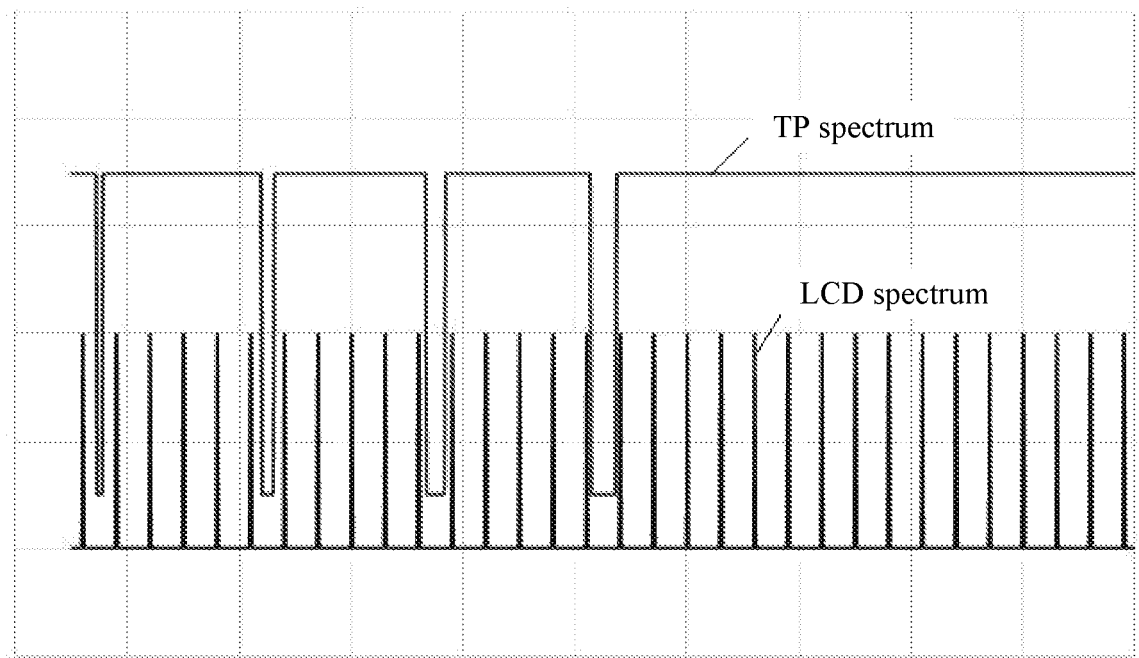
FIG. 9 is another schematic diagram of temperature drift of frequencies of a TP module and an LCD module according to an embodiment of the present invention.

When a temperature drift percentage of a frequency of the TP module is ±2%, and a temperature drift amplitude of a frequency of the LCD module basically does not change, a temperature drift amplitude of the fundamental frequency of the TP module is 1.6 kHz, a temperature drift amplitude of a third-harmonic frequency is 4.8 kHz, and a temperature drift amplitude of a seventh-harmonic frequency is 11.2 kHz. It can be learned from the foregoing that as an order of a harmonic wave increases, a temperature drift amplitude of the harmonic wave increases. It can be learned from 11.2 kHz<11.43 kHz that the temperature drift amplitude of the seventh-harmonic wave is still less than the harmonic frequency spacing. Therefore, the foregoing harmonic frequencies do not overlap, as shown in FIG. 9. It can be learned that when the foregoing fundamental frequencies are configured for different modules, harmonic interference can be effectively reduced to some extent.

Figure 10:
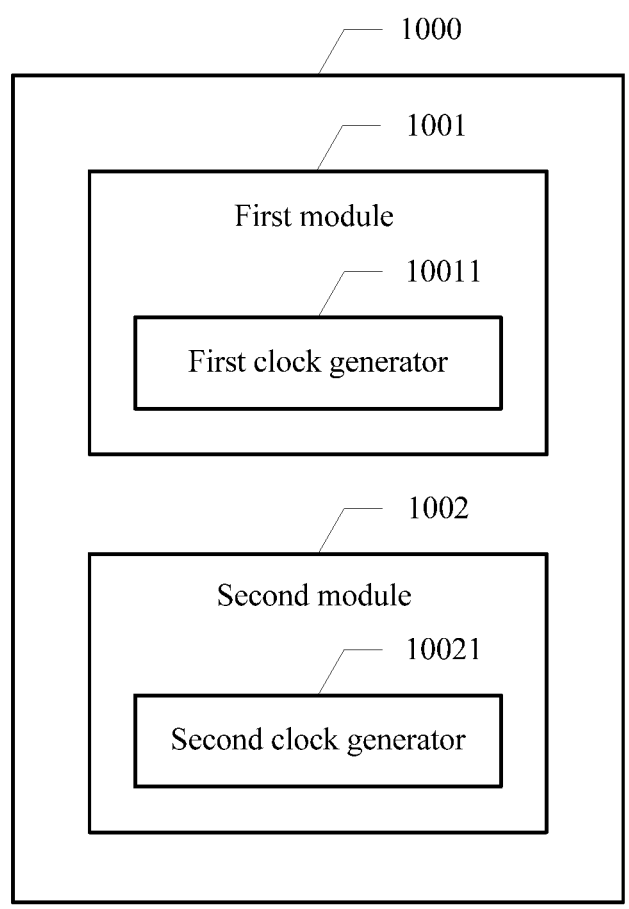
FIG. 10 is another schematic diagram of a mobile terminal according to an embodiment of the present invention.

Referring to FIG. 10, another embodiment of a mobile terminal 1000 in the present invention includes: a first module 1001 and a second module 1002, where the first module 1001 includes a first clock generator 10011, and the second module 1002 includes a second clock generator 10021.

Within a specified temperature range, a temperature drift trend of a clock frequency of the first clock generator 10011 is consistent with a temperature drift trend of a clock frequency of the second clock generator 10021, and the clock frequency of the first clock generator is different from the clock frequency of the second clock generator.

A temperature drift trend of a clock frequency is a change trend of a clock frequency offset with a change of a temperature. The specified temperature range may be a normal working temperature interval of the first module, or a normal working temperature interval of the second module, or a normal working temperature interval of the mobile terminal 1000. The normal working temperature interval of the mobile terminal 1000 is generally 0° C. to 40° C.

In this embodiment, at any temperature within the specified temperature range, that a difference between offsets of the clock frequencies of the two clock generators is less than a threshold may be considered as that the temperature drift trends of the clock frequencies of the two clock generators are consistent. Because temperature drift trends of clock frequencies of different modules are consistent, and the clock frequencies of the different modules are different, the clock frequencies of the different modules hardly overlap, so that an electromagnetic interference degree is very low.

Figure 11:
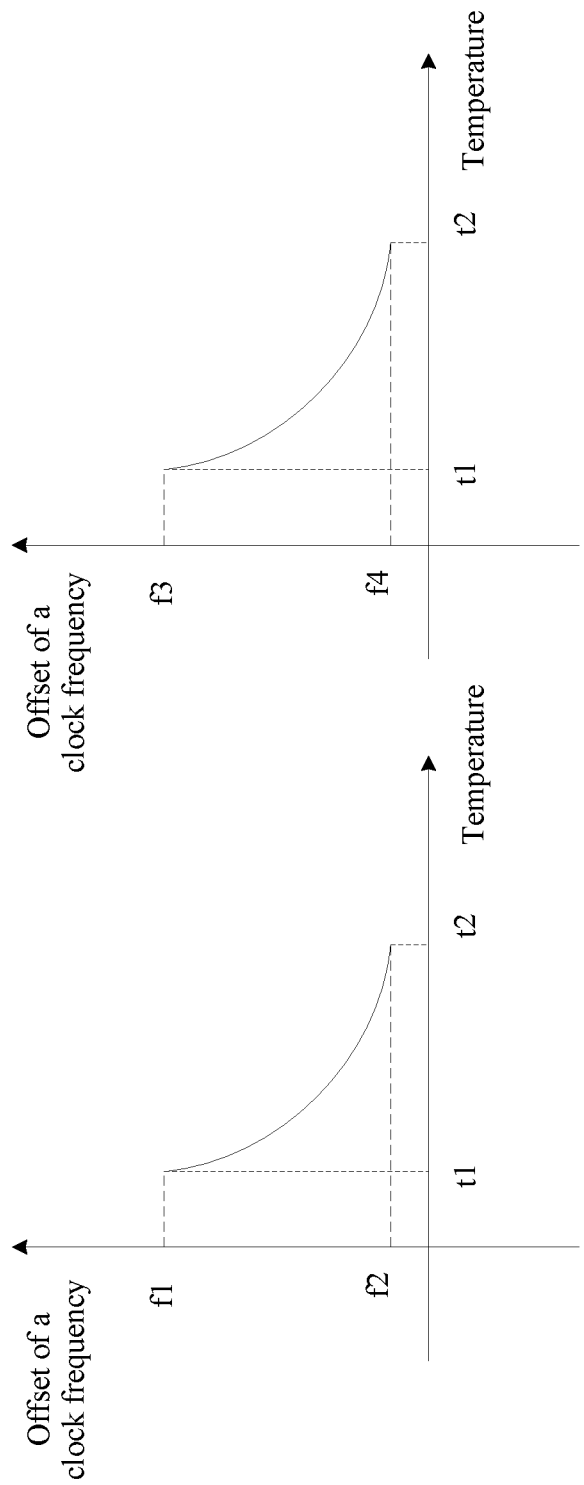
FIG. 11 is schematic diagrams of temperature drift trends of two clock frequencies according to an embodiment of the present invention.

Referring to FIG. 11, in some embodiments, both the temperature drift trend of the clock frequency of the first clock generator and the temperature drift trend of the clock frequency of the second clock generator are monotonically decreasing. When a temperature is t1, an offset of the clock frequency of the first clock generator is f1, and an offset of the clock frequency of the second clock generator is f3. When a temperature is t2, an offset of the clock frequency of the first clock generator is f2, and an offset of the clock frequency of the second clock generator is f4, where t2>t1, f1>f2, and f3>f4. When the temperature is t1, the offsets of the clock frequencies of the two clock generators both are the largest, the offsets of the clock frequencies gradually decrease as the temperature increases, and when the temperature is t2, the offsets of the clock frequencies of the two clock generators both are the smallest. A difference between the offsets of the two clock frequencies is less than a preset threshold at any temperature within [t1, t2].

Figure 12:
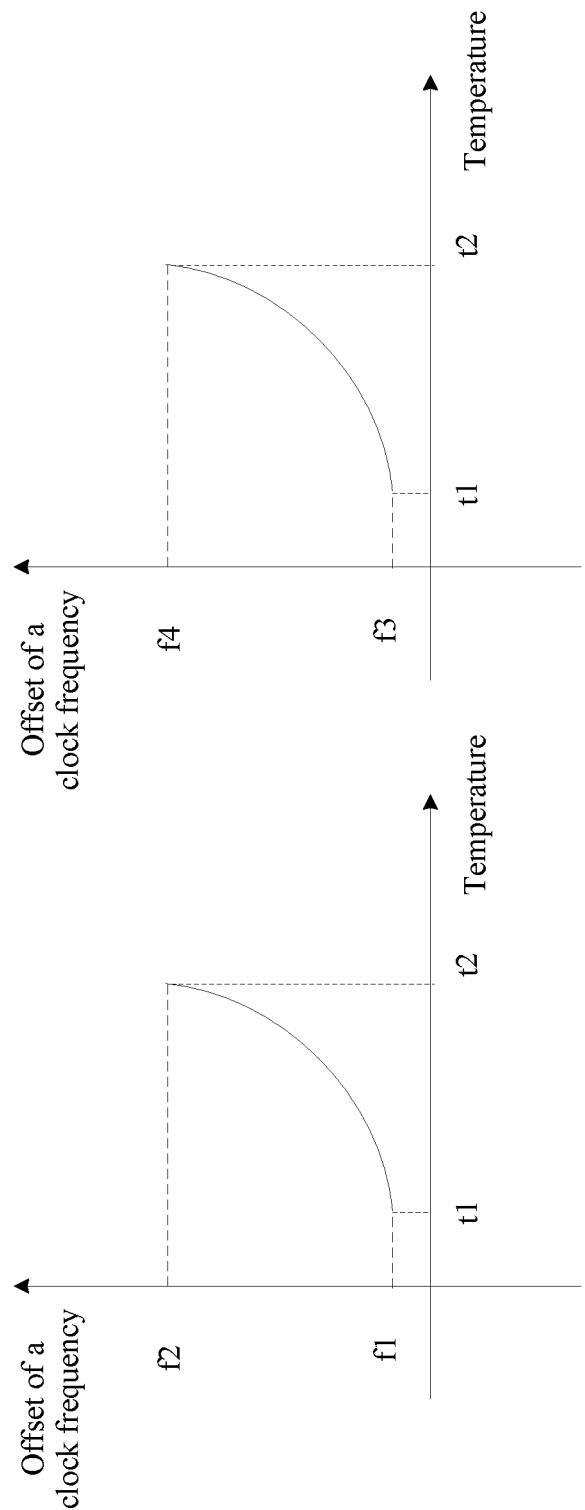
FIG. 12 is other schematic diagrams of temperature drift trends of two clock frequencies according to an embodiment of the present invention.

Referring to FIG. 12, in some other embodiments, both the temperature drift trend of the clock frequency of the first clock generator and the temperature drift trend of the clock frequency of the second clock generator are monotonically increasing. When a temperature is t1, an offset of the clock frequency of the first clock generator is f1, and an offset of the clock frequency of the second clock generator is f3. When a temperature is t2, an offset of the clock frequency of the first clock generator is f2, and an offset of the clock frequency of the second clock generator is f4, where t2>t1, f2>f1, and f4>f3. When the temperature is t1, the offsets of the clock frequencies of the two clock generators both are the smallest, the offsets of the clock frequencies gradually increase as the temperature increases, and when the temperature is t2, the offsets of the clock frequencies of the two clock generators both are the largest. A difference between the offsets of the two clock frequencies is less than a preset threshold at any temperature within [t1, t2].

Figure 13:
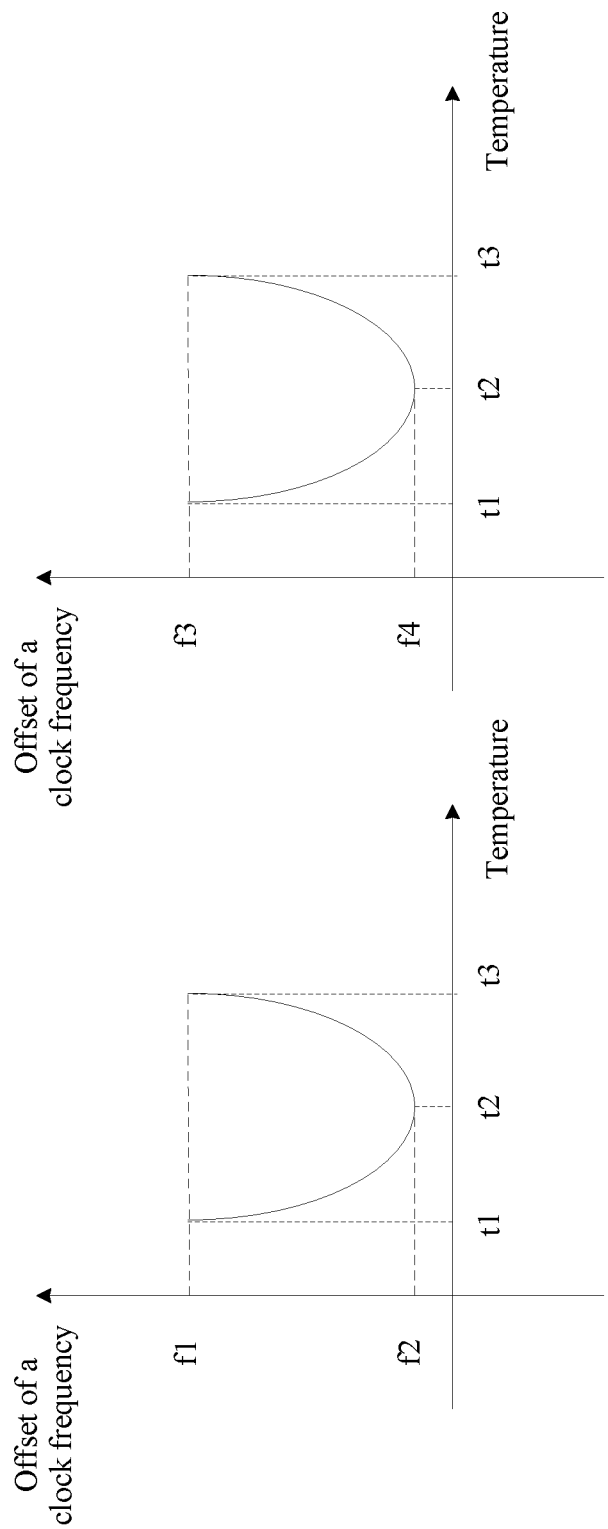
FIG. 13 is other schematic diagrams of temperature drift trends of two clock frequencies according to an embodiment of the present invention.

Referring to FIG. 13, in some other embodiments, curves of both the temperature drift trend of the clock frequency of the first clock generator and the temperature drift trend of the clock frequency of the second clock generator are parabolas. When a temperature is t1 and t3, an offset of the clock frequency of the first clock generator is f1, and an offset of the clock frequency of the second clock generator is f3. When a temperature is t2, an offset of the clock frequency of the first clock generator is f2, and an offset of the clock frequency of the second clock generator is f4, where t3>t2>t1, f1>f2, and f3>f4. When the temperature is t1, the offsets of the clock frequencies of the two clock generators both are the largest, the offsets of the clock frequencies gradually decrease as the temperature increases within [t1, t2], when the temperature is t2, the offsets of the clock frequencies of the two clock generators both are the smallest, and the offsets of the clock frequencies gradually increase as the temperature increases within [t2, t3]. A difference between the offsets of the two clock frequencies is less than a preset threshold at any temperature within [t1, t3].

In some optional embodiments, the first module 1001 is a touch panel module, a display module, a fingerprint recognition module, or a camera module, the second module 1002 is a touch panel module, a display module, a fingerprint recognition module, or a camera module, and the first module 1001 and the second module 1002 are modules of different types.

It may be understood that the mobile terminal 1000 may further include other modules such as a third module and a fourth module. In addition to a clock generator, each module further includes a function unit. For example, when the first module 1001 is a touch panel module, a function unit included in the first module 1001 may be a touch panel circuit. When the second module 1002 is a liquid crystal display module, a function unit included in the second module 1002 may be a drive circuit of a liquid crystal display.

In an optional embodiment, a ratio of the clock frequency generated by the first clock generator 10011 to the clock frequency generated by the second clock generator 10021 is M/N, where M is a positive odd number, N is 2 raised to the power of n, and n is a positive integer.

In this embodiment, because M is a positive odd number, and N is 2 raised to the power of a positive integer, M/N cannot be an integer, and the clock frequency generated by the first clock generator cannot be equal to the clock frequency generated by the second clock generator, and cannot be equal to an integer multiple of the clock frequency generated by the second clock generator. In addition, an odd harmonic wave of the clock frequency generated by the first clock generator may be a first-harmonic wave, a third-harmonic wave, a fifth-harmonic wave, or the like, a product of an odd number and M/N cannot be an integer, and an odd harmonic frequency generated by the first clock generator cannot be equal to an integer multiple of a harmonic frequency generated by the second clock generator. In this way, it can be ensured that in a normal mode, fundamental frequencies or harmonic frequencies of the first module and the second module do not overlap.

It should be noted that a difference between clock frequencies of two clock signals is always greater than or equal to F2 (1)/N, where F2 (1) is the fundamental frequency of the second module. When a temperature drift amplitude is less than F2 (1)/N, the two clock frequencies do not overlap.

In this way, harmonic interference caused by temperature drift can be effectively reduced. Alternatively, when a deviation amplitude of a clock frequency is less than F2 (1)/N due to a common difference, the foregoing two clock frequencies do not overlap. In this way, electromagnetic interference caused by the common difference can be effectively reduced.

In another optional embodiment, the first clock generator 10011 is a crystal oscillator, and the second clock generator 10021 is a crystal oscillator. Crystal shapes and crystal cutting manners of the two crystal oscillators are the same, so that temperature drift trends of the two clock generators are consistent. For example, both the temperature drift trends are monotonically increasing, monotonically decreasing, or in parabolas.

In another optional embodiment, the first clock generator 10011 is a semiconductor oscillator, and the second clock generator 10021 is a semiconductor oscillator.

In another optional embodiment, the first clock generator 10011 is a ceramic oscillator, and the second clock generator 10021 is a ceramic oscillator.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions recorded in the embodiments of the present invention.

What is claimed is:

1. A mobile terminal, comprising: a first module, a second module, a first frequency circuit and a second frequency circuit, wherein
    the first frequency circuit is connected to the first module, and is configured to provide a first clock signal to the first module;
    the second frequency circuit is connected to the second module, and is configured to provide a second clock signal to the second module, wherein
    a ratio of a clock frequency of the first clock signal to a clock frequency of the second clock signal is M/N, wherein M is a positive odd number, N is 2 raised to the power of n, and n is a positive integer; and
    the first module is a touch panel (TP) module, and the second module is a liquid crystal display (LCD) module;
    the first module comprising a third frequency circuit and a TP circuit;
    the second module comprising a fourth frequency circuit and a drive circuit of the LCD, wherein:
    the third frequency circuit is connected to both the first frequency circuit and the TP circuit, and is configured to: perform frequency conversion on the first clock signal, to obtain a third clock signal, and output the third clock signal to the TP circuit; and
    the fourth frequency circuit is connected to both the second frequency circuit and the drive circuit of the LCD, and is configured to: perform frequency conversion on the second clock signal, to obtain a fourth clock signal, and output the fourth clock signal to the drive circuit of the LCD, wherein
    a ratio of a clock frequency of the third clock signal to a clock frequency of the fourth clock signal is M/N, wherein M is a positive odd number, N is 2 raised to the power of n, and n is a positive integer.

2. A mobile terminal, the mobile terminal comprises a first module and a second module, wherein the first module comprises a first clock generator, and the second module comprises a second clock generator, and wherein a ratio of a clock frequency generated by the first clock generator to a clock frequency generated by the second clock generator is M/N, wherein M is a positive odd number, N is 2 raised to the power of n, and n is a positive integer, wherein both a temperature drift trend of the clock frequency generated by the first clock generator and a temperature drift trend of the clock frequency generated by the second clock generator are monotonically decreasing; or both the temperature drift trend of the clock frequency generated by the first clock generator and the temperature drift trend of the clock frequency generated by the second clock generator are monotonically increasing; or curves of both the temperature drift trend of the clock frequency generated by the first clock generator and the temperature drift trend of the clock frequency generated by the second clock generator are parabolas.

3. The mobile terminal of claim 2, wherein a temperature drift trend of the clock frequency of the first clock generator is consistent with a temperature drift trend of the clock frequency of the second clock generator.

4. The mobile terminal of claim 2, wherein
the first module is a touch panel (TP) module, and the second module is a liquid crystal display (LCD) module.

5. The mobile terminal of claim 2, wherein
the first module is a liquid crystal display (LCD) module, and the second module is a touch panel (TP) module.

6. The mobile terminal of claim 2, wherein:
the first module is a camera module, and the second module is a liquid crystal display (LCD) module.

7. The mobile terminal of claim 2, wherein:
the first module is a camera module, and the second module is a touch panel (TP) module.

8. The mobile terminal of claim 2, wherein both the first clock generator and the second clock generator are crystal oscillators.

9. The mobile terminal of claim 2, wherein both the first clock generator and the second clock generator are semiconductor oscillators.

10. The mobile terminal of claim 2, wherein both the first clock generator and the second clock generator are ceramic oscillators.

* * * * *